(12) United States Patent
Abbott

(10) Patent No.: US 7,834,296 B2
(45) Date of Patent: Nov. 16, 2010

(54) ELECTRIC GRILL AND METHOD OF PROVIDING THE SAME

(75) Inventor: Richard C. Abbott, New Boston, NH (US)

(73) Assignee: Thermoceramix Inc., Shirley, MA (US)

(*) Notice: Subject to any disclaimer, the term of this patent is extended or adjusted under 35 U.S.C. 154(b) by 877 days.

(21) Appl. No.: 11/474,650

(22) Filed: Jun. 26, 2006

(65) Prior Publication Data

US 2006/0288998 A1 Dec. 28, 2006

Related U.S. Application Data

(60) Provisional application No. 60/693,609, filed on Jun. 24, 2005.

(51) Int. Cl.
*F24C 7/10* (2006.01)
*F27D 11/00* (2006.01)

(52) U.S. Cl. .............................. 219/386; 219/385

(58) Field of Classification Search ............... 219/386, 219/385, 388, 387
See application file for complete search history.

(56) References Cited

U.S. PATENT DOCUMENTS

| | | | |
|---|---|---|---|
| 3,610,888 A | 10/1971 | Button | |
| 3,678,844 A * | 7/1972 | Marshall | 99/340 |
| 3,919,441 A * | 11/1975 | Horiki | 428/426 |
| 4,034,663 A | 7/1977 | Jenn et al. | |
| 4,377,618 A * | 3/1983 | Ikeda et al. | 428/323 |
| 4,384,192 A | 5/1983 | Lowell et al. | |
| 4,403,540 A | 9/1983 | Erkelenz | |
| 4,430,559 A | 2/1984 | Rabay | |
| 4,663,517 A | 5/1987 | Huff et al. | |
| 4,808,490 A | 2/1989 | Tsukuda et al. | |
| 4,860,434 A | 8/1989 | Louison et al. | |
| 5,036,180 A | 7/1991 | Scott | |
| 5,039,840 A | 8/1991 | Boardman | |
| 5,039,940 A * | 8/1991 | Johnson et al. | 324/73.1 |
| 5,272,317 A | 12/1993 | Ryu | |
| 5,355,779 A | 10/1994 | O'Brien et al. | |
| 5,355,780 A * | 10/1994 | Campbell | 99/450 |
| 5,546,851 A | 8/1996 | Goto | |
| 5,582,094 A | 12/1996 | Peterson et al. | |
| 5,616,266 A | 4/1997 | Cooper | |
| 5,719,377 A | 2/1998 | Giebel et al. | |
| 5,845,562 A | 12/1998 | Deni et al. | |
| 5,889,261 A | 3/1999 | Boardman | |
| 5,970,858 A | 10/1999 | Boehm et al. | |
| 5,973,298 A | 10/1999 | Kallgren | |
| 6,016,741 A | 1/2000 | Tsai et al. | |
| 6,037,571 A | 3/2000 | Christopher | |
| 6,037,572 A | 3/2000 | Coates et al. | |
| 6,104,004 A | 8/2000 | Ragland et al. | |
| 6,150,636 A | 11/2000 | Bogdanski et al. | |
| 6,225,608 B1 | 5/2001 | Kallgren | |

(Continued)

FOREIGN PATENT DOCUMENTS

WO WO 00/70915 11/2000

*Primary Examiner*—Daniel Robinson
(74) *Attorney, Agent, or Firm*—Olser, Hoskin & Harcourt LLP

(57) ABSTRACT

An electric grill is provided having a grate, a first electrical insulator layer located above the grate, a heater layer deposited on a top surface of the first electrical insulator layer, and a top layer located over the heater layer for protecting the heater layer.

21 Claims, 6 Drawing Sheets

U.S. PATENT DOCUMENTS

| | | |
|---|---|---|
| 6,262,399 B1 | 7/2001 | Lau et al. |
| 6,386,092 B1 | 5/2002 | Grohs |
| 6,762,396 B2 * | 7/2004 | Abbott et al. ............... 219/543 |
| 6,818,868 B2 | 11/2004 | Grohs |
| 6,831,256 B2 | 12/2004 | Haasis et al. |
| 6,919,543 B2 | 7/2005 | Abbott et al. |
| 6,921,882 B2 | 7/2005 | Gadow et al. |
| 6,924,468 B2 | 8/2005 | Abbott et al. |
| 7,025,893 B2 | 4/2006 | Goodsel et al. |
| 7,158,718 B2 | 1/2007 | Russegger |
| 7,176,420 B2 * | 2/2007 | Abbott et al. ............... 219/543 |
| 7,220,365 B2 * | 5/2007 | Qu et al. ....................... 252/70 |
| 7,265,323 B2 | 9/2007 | Gerhardinger et al. |
| 7,301,127 B1 | 11/2007 | Derridinger, Jr. |
| 7,301,128 B2 | 11/2007 | Li et al. |
| 7,342,202 B2 | 3/2008 | Bachinski et al. |
| 7,645,963 B2 * | 1/2010 | Werkman et al. ........... 219/543 |
| 2003/0066828 A1 | 4/2003 | Boardman |
| 2003/0121906 A1 | 7/2003 | Abbott et al. |
| 2004/0188418 A1 | 9/2004 | Aisenbrey |
| 2005/0252906 A1 | 11/2005 | Shaw et al. |
| 2006/0027555 A1 | 2/2006 | Aisenbrey |
| 2006/0163242 A1 | 7/2006 | Ciancimino et al. |
| 2007/0000918 A1 | 1/2007 | Steinhauser et al. |
| 2008/0075876 A1 | 3/2008 | Boardman |

* cited by examiner

ELECTRIC GRILL AND METHOD OF PROVIDING THE SAME

CROSS-REFERENCE TO RELATED APPLICATION

This application claims priority to U.S. provisional patent application entitled, "SYSTEM AND METHOD FOR PROVIDING AN ELECTRIC GRILL," having Ser. No. 60/693,609, filed Jun. 24, 2005, which is entirely incorporated herein by reference.

FIELD OF THE INVENTION

The present invention is generally related to cooking devices, and more particularly is related to an electric grill.

BACKGROUND OF THE INVENTION

Grills often use a heat source. Examples of such heat sources include combustible gas, such as propane, or solid fuel, such as charcoal. However, fire codes often prohibit grilling with open flames that gases or charcoal produce and users often prefer not working with open flames. In addition, refilling tanks holding the combustible gas, and purchasing solid fuel, can be inconvenient and expensive.

To address the above-mentioned issues, electric grills have been introduced. Electric grills alleviate the need for open flames, thereby alleviating the expense and inconvenience. Moreover, they comply with fire code regulations. Unfortunately, electric grills use wire type tubular elements that are too inefficient at a common household voltage of 120 volts to provide adequate temperatures for searing meat over reasonably sized cooking areas. Specifically, the inefficiency of electric grills prevents an electric grill from achieving the elevated temperatures necessary for performing cooking functions such as searing meat and from recovering back to cooking temperature after food has been distributed over the grilling surface.

Thus, a heretofore unaddressed need exists in the industry to address the aforementioned deficiencies and inadequacies.

SUMMARY OF THE INVENTION

Embodiments of the present invention provide a system for providing an electric grill. In principle, a grill will heat primarily by thermal conduction or primarily by thermal radiation. This invention describes systems that utilize thin, film type electrical resistive heating elements that generate and transfer heat to the food either principally by conduction or principally by radiation.

When thermal conduction is the primary mode of heat transfer, the film element can be disposed over a surface of the grill either on top of the grilling surface or on the underside of the grilling surface. Heat is generated by passing an electrical current through the resistive film heating element whereupon the heat is conducted directly to the food if the element is on the top surface of the grill or through the metal grilling surface and then to the food if the element is on the bottom surface of the grill.

When thermal radiation is the primary mode of heat transfer, the film element can be disposed over a surface positioned either below the grilling surface or above the grilling surface. Here, electrical current passes through the film heating element such that the substrate upon which the element is deposited heats to a temperature sufficiently high for thermal radiation to be emitted in sufficient intensity to heat the food to the desired cooking temperature.

Briefly described, in architecture, one embodiment of the system, among others, can be implemented as follows. The electric grill has a grate, a first electrical insulator layer located above the grate, a heater layer deposited on a top surface of the first electrical insulator layer, and a top layer located over the heater layer for protecting the heater layer.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

This present invention provides an electric grill, or barbeque, that uses electric resistive heaters (referred to as "heater layers") in the form of coatings as a heat source. A power source may be connected to the heater layer 130 to provide power to the heater layer, resulting in the resistive heater radiating energy (i.e., heating). An example of a process for making a resistive heater is described in the U.S. Pat. No. 6,919,543, assigned to ThermalCeramix, LLC, issued Jul. 19, 2005, and having been filed Nov. 28, 2001, the disclosure of which is incorporated herein in its entirety.

The electric grill contains a supporting structure for holding food thereon (i.e., a grate), means for draining grease or any other liquid that comes from food cooking on the electric grill, and a heater layer. In accordance with the present invention, the heater may be provided as, for example, but not limited to, a coating.

Figure 1:
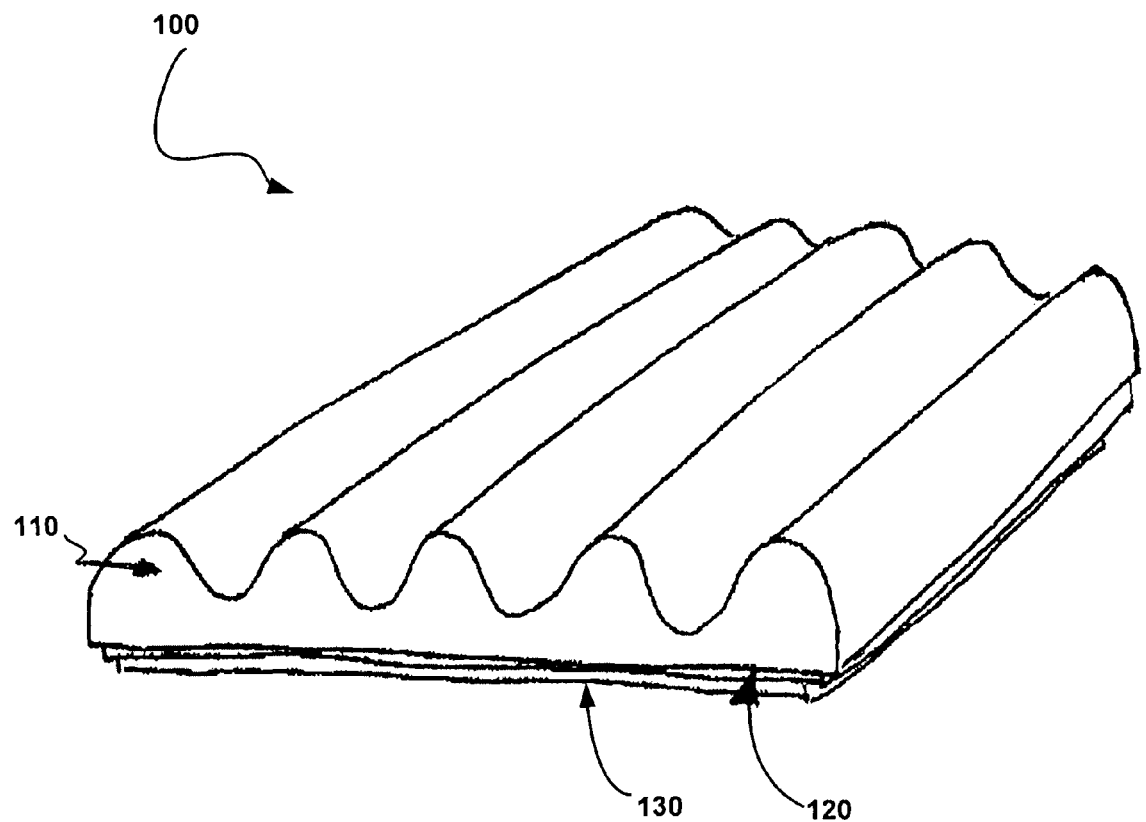
FIG. 1 is a schematic diagram illustrating an example of an electric grill, in accordance with a first exemplary embodiment of the invention.

FIG. 1 is a schematic diagram illustrating an example of an electric grill, in accordance with a first exemplary embodiment of the invention. As is shown by FIG. 1, the electric grill 100 contains a solid casting grate 110 on which food to be cooked is placed. An example of material that may be used for the solid casting grate 110 is aluminum. Of course, other known conductive materials such as cast iron, carbon steel or stainless steel may be used as well. An electrical insulator layer 120 (e.g., an electrical insulator coating) is located on a bottom portion of the solid casting grate 110. In addition, a heater layer 130 (e.g., a heater coating) is deposited on a bottom portion of the electrical insulator layer 120, on a portion opposite the solid casting grate 110. In accordance with the first exemplary embodiment of the invention, heat flows virtually unimpeded up from the heater layer 130, through the electrical insulator layer 120, to the solid casting grate 110. Of course, the solid casting grate 110 may be replaced by a casting grate that is not solid or simply shaped differently.

Figure 2A:
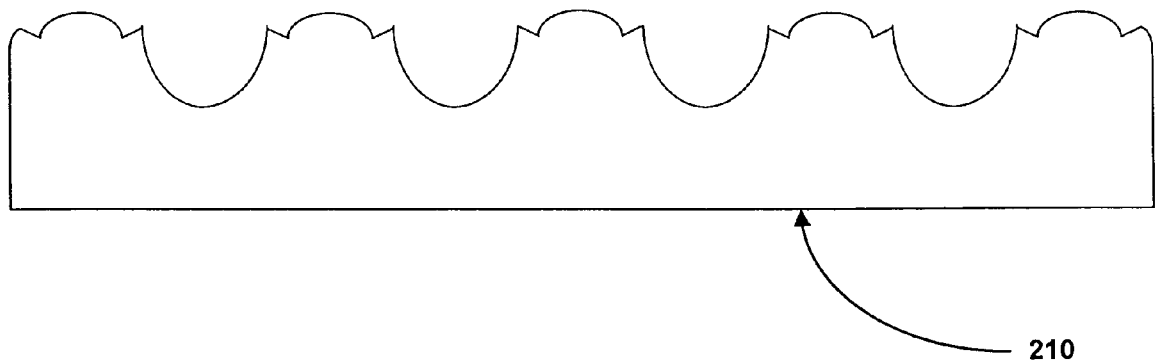
FIG. 2A is a schematic diagram illustrating an example of an electric grill, in accordance with a second exemplary embodiment of the invention.
Figure 2B:
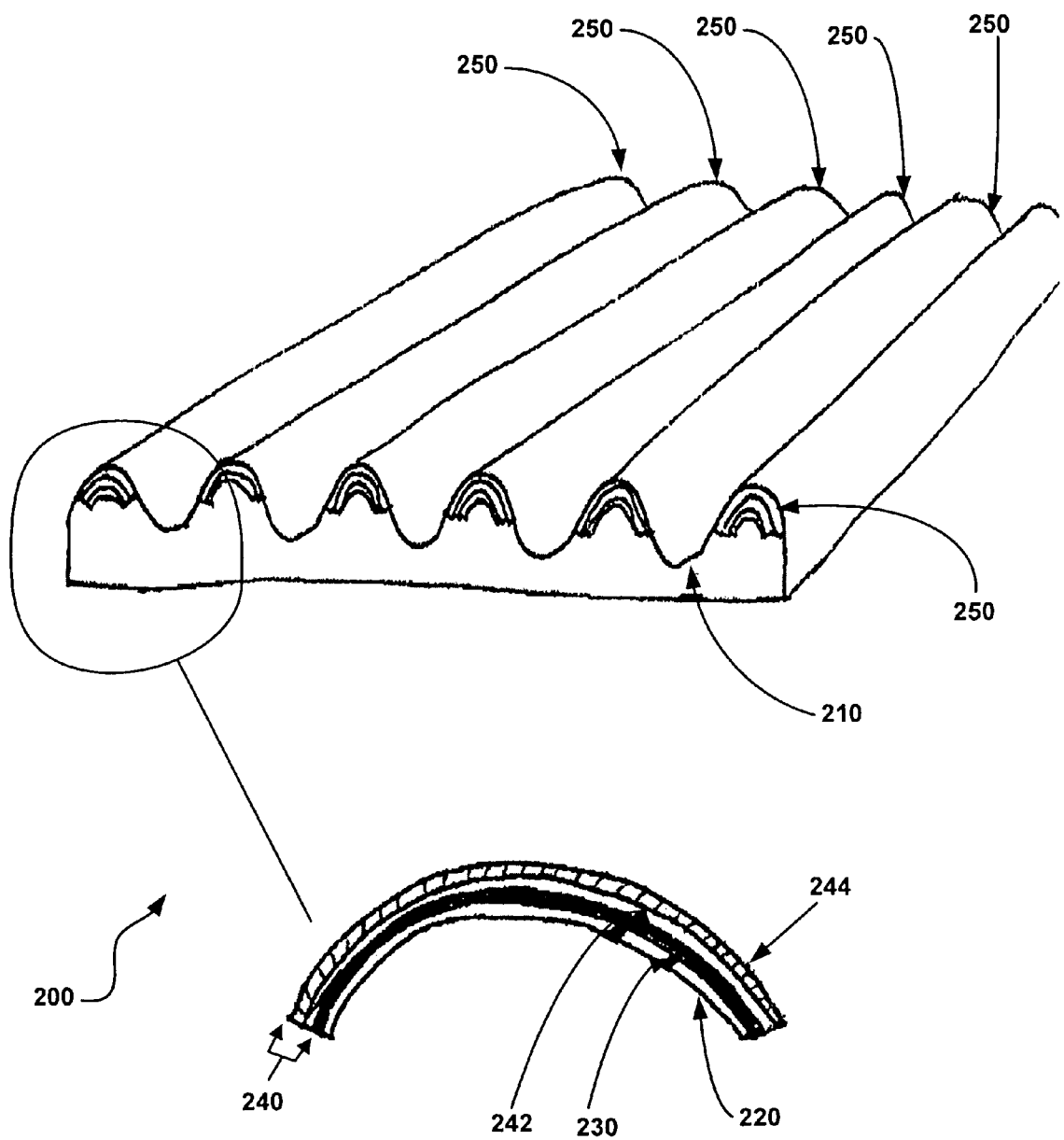
FIG. 2B is a schematic diagram further illustrating a grate located within the electric grill of FIG. 2A.

FIG. 2A is a schematic diagram illustrating an example of an electric grill in accordance with a second exemplary embodiment of the invention. As is shown by FIG. 2B, the electric grill 200 contains a solid casting grate 210. FIG. 2B is a schematic diagram further illustrating the grate 210 without having layers deposited thereon, as is further explained herein.

Returning to FIG. 2A, it can be seen that the grate 210 contains a series of ridges 250, which are raised portions of the grate 210. Other portions of the grate 210 are concave in shape. A first electrical insulator layer 220 (e.g., an electrical insulator coating) is located between the grate 210 and a heater layer 230 (e.g., a heater coating), where the heater layer 230 is deposited on a top surface of the first electrical insulator layer 220. Specifically, the first electrical insulating layer 220 is located on a top surface of the grate 210. In addition, the heater layer 230 is located on a top surface of the first electrical insulating layer 220.

A top layer 240 is provided on a top surface of the heater layer 230 and may be provided as a coating or otherwise on the heater layer 230. The top layer 240 serves to protect the heater layer 230 from grease, other substances, and abuse. It should be noted that the top layer 240 may contain either a second electrical insulator layer 242 (e.g., a ceramic insulator), or a second electrical insulator layer 242 (e.g., ceramic insulator) and a metal layer 244 located on top of the second electrical insulator layer 242. It should be noted that the top layer 240 prevents the user of the electric grill 200 from being exposed to electrical hazard.

The exemplary electric grill 200 of FIG. 2A shows that the first electrical insulator layer 220, the heater layer 230, and the top layer 240 are located within each ridge 250 of the electric grill 200. Therefore, there are a number of groups of the above-mentioned components, where each group is located beneath a ridge 250. Alternatively, the entire solid casting grate 210 may be covered with one first electrical insulator layer 220, one heater layer 230, and one top layer 240 (not shown).

Figure 3:
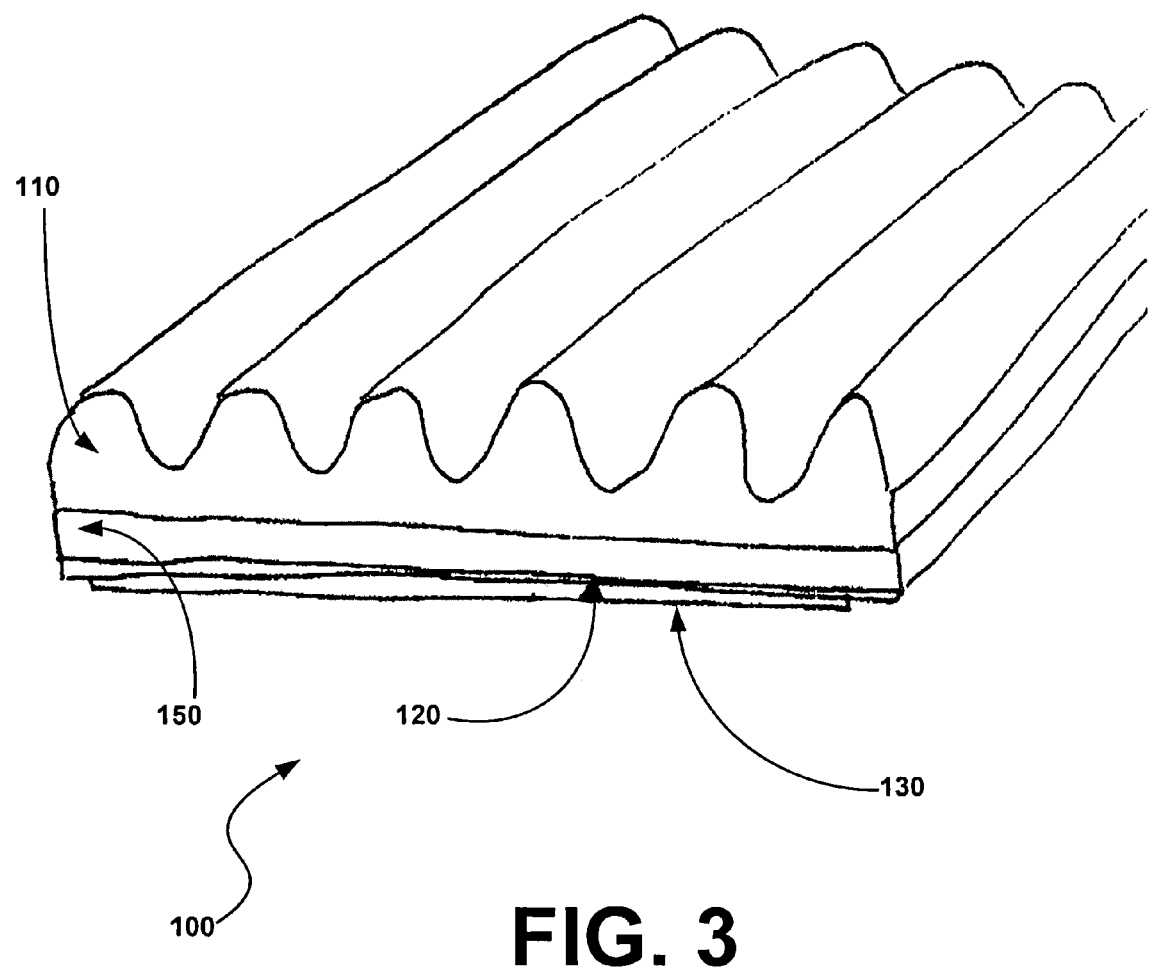
FIG. 3 is a schematic diagram illustrating a variation of the electric grill 100 of FIG. 1.

FIG. 3 is a schematic diagram illustrating a variation of the electric grill 100 of FIG. 1. Specifically, the electric grill 100 also contains a heater plate 150 located between the electrical insulator layer 120 (e.g., an electrical insulator coating) and the bottom portion of the solid casting grate 110. The heater plate 150 is capable of conducting heat (i.e., receiving energy) from the heater layer 130 and transferring the heat to the solid casting grate 110. It should be noted that the heater plate 150 may be removably connected to the solid casting grate 110 and/or the electrical insulator layer 120. Alternatively, the solid casting grate 110 may simply rest on the heater plate 150. In addition, in accordance with another alternative embodiment of the invention, the heater plate 150 may contain the heater layer 130 therein.

Figure 4:
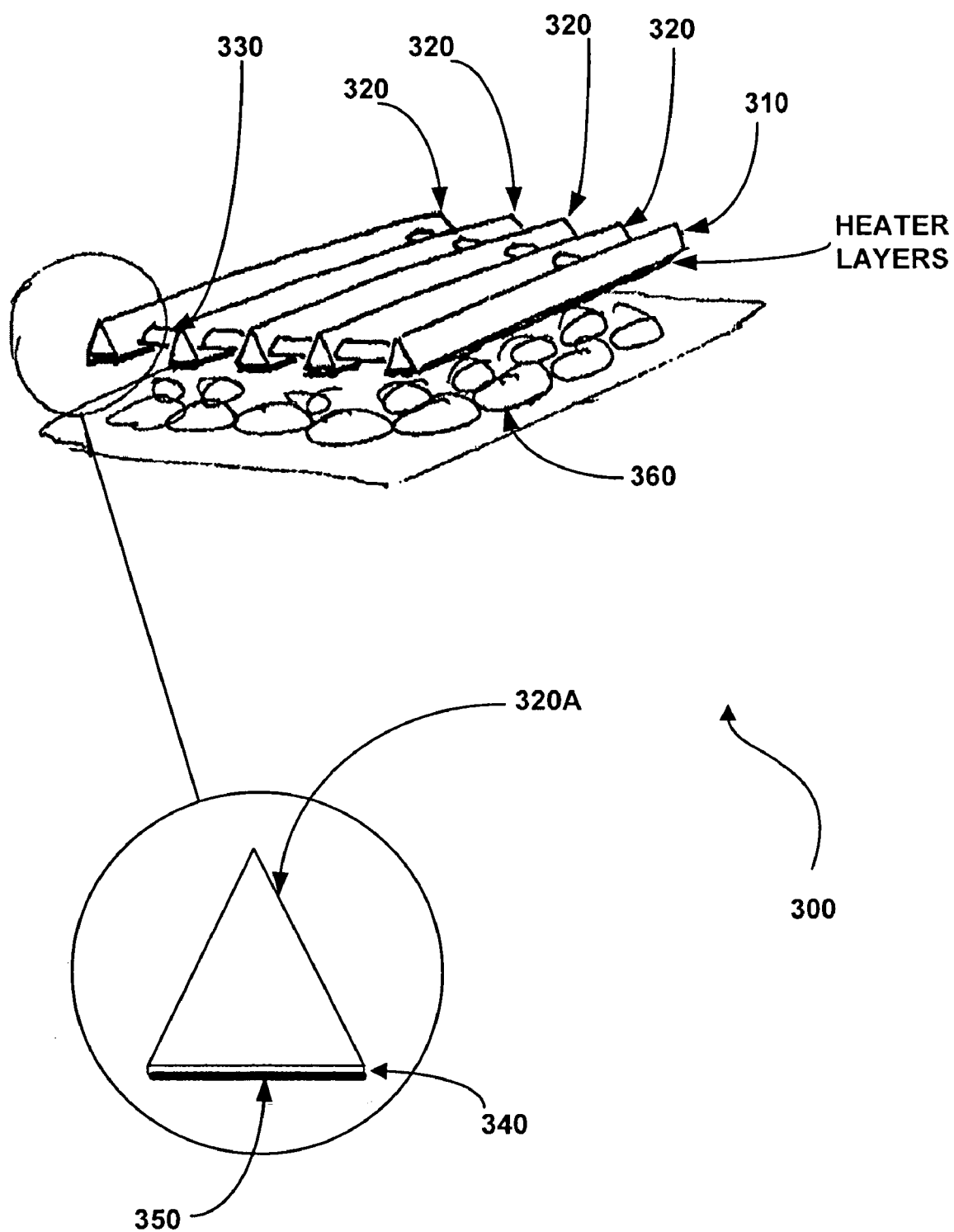
FIG. 4 is a schematic diagram illustrating an electric grill, in accordance with a third exemplary embodiment of the invention.

FIG. 4 is a schematic diagram illustrating an electric grill in accordance with a third exemplary embodiment of the invention. As is shown by FIG. 4, the electric grill 300 has a grate 310 having a different design from the grate 110 of FIG. 1. Specifically, the grate 310, in accordance with the third exemplary embodiment of the invention, contains a series of shaped rods 320 having connecting bars 330 connecting the shaped rods 320. Describing one shaped rod 320A, each shaped rod 320A has an electrical insulator layer 340 located on a bottom surface of the shaped rod 320A and a heater layer 350 located beneath the electrical insulator layer 340. It should be noted that ceramic tiles 360 may be positioned below the grate 310 for evaporating grease and other secretions from food being cooked on the electric grill 300. In addition, while FIG. 4 illustrates each shaped rod 320 as being triangular in shape, one having ordinary skill in the art would appreciate that the shaped rods 320 may be shaped differently.

Figure 5:
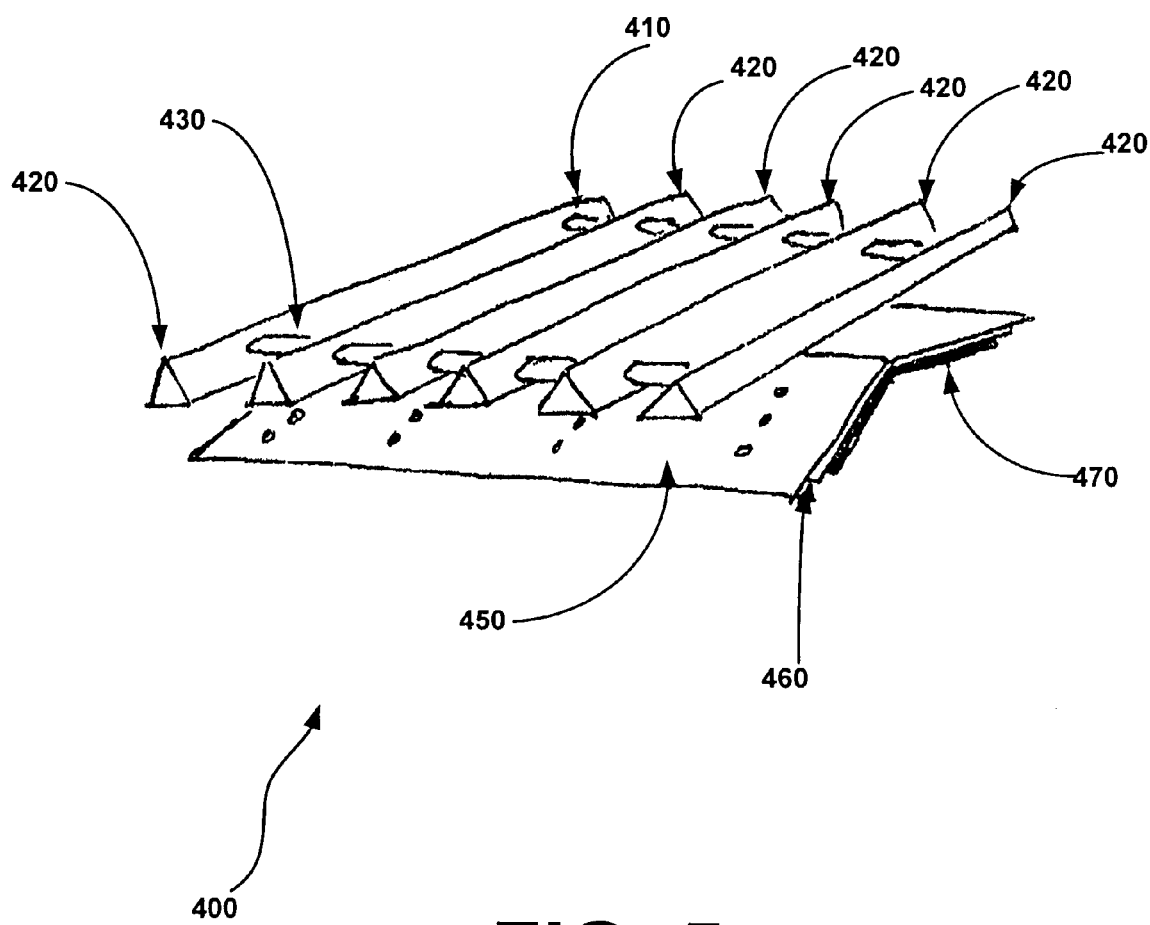
FIG. 5 is a schematic diagram illustrating an electric grill, in accordance with a fourth exemplary embodiment of the invention.

FIG. 5 is a schematic diagram illustrating an electric grill, in accordance with a fourth exemplary embodiment of the invention. As shown by FIG. 5, the electric grill 400 has a grate 410 having a different design from the grate 110 of FIG. 1. Specifically, the grate 410, in accordance with the fourth exemplary embodiment of the invention, contains a series of shaped rods 420 having connecting bars 430 connecting the shaped rods 420. A heating plate 450 may be positioned below the grate 410 for purposes of radiating energy (i.e., providing heat) up to food positioned on the grate 410. The heating plate 450 may be shaped and sized many different ways for purposes of radiating heat. An electrical insulator layer 460 is located below the heating plate 450 and a heater layer 470 is located beneath the electrical insulator layer 460.

Alternatively, the heating plate for 450, electrical insulator layer 460, and heater layer 470 may be located separate from the grate 410. As one example, the heating plate 450, electrical insulator layer 460, and heater layer 470 may be located above the grate 410, such as on a hood of a barbecue grill, or on a shelf like structure they can be positioned above food resting on the grate 410. In such an arrangement, energy radiates down to the food. Such a configuration would be ideal for broiling food resting on the grate 410.

The heater layers mentioned above are preferably provided as coatings, although other methods may be used for providing the heater layers. As coatings, the heater layers can be made using many different coating technologies. Performance of the coatings depends on materials chosen for the resistor, the dimensions of the element, and the method by which the coating is deposited. Examples of coating techniques include, but are not limited to: thermal spray, an example of which is described by U.S. Pat. No. 6,919,543, which has been incorporated by reference in its entirety; thick film printing and deposition; chemical vapor deposition; evaporation; sputtering; kinetic spray; and cut foil encapsulated in polymer film and adhered to a substrate.

The heater layers are designed with knowledge of the applied voltage and power desired. From these quantities, a necessary resistance is calculated. Knowing the resistance and the material resistivity, the dimensions of the heater layers, or an element containing a heater layer, can then be determined. Sometimes, as in thermal spray or thick film deposition, the material resistivity can be modified to optimize the design. It should be noted that the heater layers or element containing a heater layer, may be shaped many different ways so as to provide heating in accordance with a required heating pattern.

There are many advantages to using a heater layer provided as a coating in accordance with the present invention including, but not limited to: the heater coating occupying almost no space and having almost no mass, thereby allowing a compact design and adding to thermal efficiency since the heater coating does not require energy to heat up; the heater coating being typically well bonded to a part, or substrate, that it is deposited on, thereby maintaining very little impedance to the flow of heat to that part (i.e., increased thermal efficiency); the heater coating distributing power over an area it covers; the heater coating having the capability of distributing power nonuniformly over its surface to compensate for edge losses, thereby providing uniform temperature distributions over a grilling surface; and, the heater coating being amenable to common manufacturing methods where cost and volume are important.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. An electric grill, comprising:
   a grate;
   an electrical insulator layer located on a bottom portion of said grate;
   a thermally-sprayed electrically resistive heater layer deposited on a bottom portion of said electrical insulator layer, on a portion opposite said grate; and
   a heater plate located between said grate and said electric insulator layer, where said heater plate is capable of receiving energy radiated from the heater layer and transferring the received energy to the grate.

2. The electric grill of claim 1, wherein said heater layer is an electric resistive heater operating at 120 volts.

3. The electric grill of claim 1, wherein said grate is a solid casting grate.

4. The electric grill of claim 1, further comprising a power supply connected to said heater layer.

5. The electric grill of claim 1, wherein said grate comprises a series of rods and a series of connecting bars joining said rods, said electrical insulator layer and said heater layer being located on said series of rods.

6. The electric grill of claim 5, wherein said electrical insulator layer and said heater layer is located on said connecting bars.

7. An electric grill, comprising:
   a grate;
   an electrical insulator layer located on a bottom portion of said grate; and
   a heater layer deposited portion opposite said grate, said grate comprising a series of rods and a series of connecting bars joining said series of rods, said electrical insulator layer and said heater layer being located on said series of rods and not on said connecting bars.

8. An electric grill, comprising:
   a grate;
   an electrical insulator layer located on a bottom portion of said grate; and
   a heater layer deposited portion opposite said grate, said grate comprising a series of rods and a series of connecting bars joining said series of rods, said electrical insulator layer and said heater being located on said series of rods and on said connecting bars.

9. An electric grill, comprising:
   a grate;
   a first electrical insulator layer located above said grate;
   an electrically resistive heater layer deposited on a top surface of said first electrical insulator layer; and
   a top layer located over said heater layer for protecting said heater layer, the top layer further comprising a second electrical insulator layer and a metal layer, wherein the metal layer is located on top of said second electrical insulator layer.

10. The electric grill of claim 9, wherein said heater is an electric resistive heater operating at 120 volts.

11. The electric grill of claim 9, further comprising a power supply connected to said heater layer.

12. The electric grill of claim 9, further comprising a heating plate, wherein said electrical insulator layer is located above said heating plate, and said heater layer is located above said electrical insulator layer.

13. The electric grill of claim 9, wherein said heating plate, said electrical insulator layer, and said heater layer are located on a bottom portion of a barbeque grill cover.

14. The electric grill of claim 9, wherein said heater layer comprises a thermally-sprayed heater layer.

15. An electric grill, comprising:
   a grate having a series of ridges separated by a series of concave surfaces;
   a first electrical insulator layer located above each ridge of said grate;
   an electrically resistive heater layer located on a top surface of said first electrical insulator layer; and
   a top layer located over said heater layer for protecting said heater layer, the top layer further comprising a second electrical insulator layer located on a top surface of said heater layer.

16. The electric grill of claim 15, wherein said heater layer is deposited on said top surface.

17. The electric grill of claim 15, wherein said top layer further comprises a metal layer located on a top portion of said second electrical insulator layer.

18. The electric grill of claim 15, wherein said heater layer is an electric resistive heater operating at 120 volts.

19. The electric grill of claim 18, further comprising a power supply connected to said heater layer.

20. The electric grill of claim 15, wherein said grate is a solid casting grate.

21. The electric grill of claim 15, wherein said heater layer comprises a thermally-sprayed heater layer.

* * * * *